(12) United States Patent
Håkansson et al.

(10) Patent No.: US 6,709,477 B1
(45) Date of Patent: Mar. 23, 2004

(54) OIL SEPARATOR FOR SMALL PARTICLES

(75) Inventors: Nils Olof Håkansson, Stenkullen (SE); Per Persson, Partille (SE)

(73) Assignee: Volvo Lastvagnar AB, Gothenburg (SE)

(*) Notice: Subject to any disclaimer, the term of this patent is extended or adjusted under 35 U.S.C. 154(b) by 0 days.

(21) Appl. No.: 10/019,565

(22) PCT Filed: Jun. 30, 2000

(86) PCT No.: PCT/SE00/01394

§ 371 (c)(1),
(2), (4) Date: Jun. 5, 2002

(87) PCT Pub. No.: WO00/00969

PCT Pub. Date: Jan. 4, 2001

(30) Foreign Application Priority Data

Jun. 30, 1999 (SE) .............................................. 9902490

(51) Int. Cl.⁷ .............................................. B01D 45/14
(52) U.S. Cl. ................ 55/401; 55/406; 55/44; 55/DIG. 19; 96/189; 123/573
(58) Field of Search ................ 55/400, 401, 406, 55/407, 440, 521, DIG. 19; 96/188, 189, 190; 494/76, 77, 78; 123/573

(56) References Cited

U.S. PATENT DOCUMENTS 3,662,524 A * 5/1972 Guzdar et al. ................ 55/400
5,542,402 A   8/1996 Lee et al.
5,954,035 A * 9/1999 Hofer et al. ................ 123/573

FOREIGN PATENT DOCUMENTS

| EP | 0 286 160 | 10/1988 |
| WO | WO 94/23823 | 10/1994 |
| WO | WO 97/44117 | 11/1997 |

* cited by examiner

*Primary Examiner*—Robert A. Hopkins
(74) *Attorney, Agent, or Firm*—Young & Thompson

(57) ABSTRACT

Device for separating oil mist from blow-by gases from an internal combustion engine, comprising a rotating cylindrical container (17) with a central inlet (23) for gases with oil mist at one end and a central outlet (24) for gases and peripheral outlets (25) for separated oil at the other end. Between the inlet and the outlet, narrow channels (34) extend in several layers, spaced from the axis of rotation, through which the gas with oil drops flows. Under the influence of the centrifugal force the drops of oil are moved at the same time radially, the rotational speed and the length and radial dimension of the channels being adapted to each other so that the oil drops strike the channel walls before flowing out of the channels.

20 Claims, 2 Drawing Sheets

OIL SEPARATOR FOR SMALL PARTICLES

BACKGROUND OF THE INVENTION

The present invention relates to a device for separating small drops of liquid from a flowing gas containing liquid mist, comprising a first container, formed of a cylindrical lateral wall and two opposite end walls, said first container having an inlet in one end wall for the gas/mist, a first outlet in its other end wall for the gas and a second outlet at or in the vicinity of the second end wall for liquid separated out of the gas, a second container with means for rotatably mounting the first container in the second container rotationally symmetrically in relation to said inlet and said first outlet, and drive means for rotation of the first container in the second container.

DESCRIPTION OF THE RELATED ART

It is a known fact that it is not possible to achieve piston ring seals between the pistons and the surrounding cylinder walls of the cylinders in an internal combustion engine, which seal off the combustion chambers 100% against the engine crankcase. A certain small amount of combustion gases, called here blow-by gas, thus always flows past the piston rings and down into the engine crankcase. In order to prevent excessive pressure caused by the blow-by gas in the crankcase, the crankcase must be ventilated and the gas drawn off leaving only a low overpressure in the crankcase.

Two types of crankcase ventilation are used, viz. either open or closed ventilation. An engine with open ventilation can, quite simply, have a downwardly directed tube connected to the valve cover, for example, and which opens into the surrounding atmosphere. In an engine with closed crankcase ventilation, the blow-by gases from the crankcase are led to the engine intake conduit and are mixed with the intake air.

When evacuating blow-by gases, it has, up to now, been unavoidable that a certain amount of oil mist will accompany them. The amount of oil being carried with the gas depends on the placement of the ventilation outlet and any filters or oil traps in the crankcase ventilation. Regardless of whether the engine has open or closed crankcase ventilation, it is desirable to keep the amount of oil in the evacuated blow-by gas at a minimum. In the first case, it is to minimize the effect on the environment and to keep the engine oil consumption at a low level. In the second case, it is to prevent oil deposits on or in the components of the engine intake system, e.g. oil deposits on the impeller blades of the compressor of a turbo-charged engine or oil deposits in the charge air cooler in engines with charge air cooling.

A number of different devices to separate oil from blow-by gases from internal combustion engines are known. Among them are various types of baffle or screen systems, metal wire or textile fibre filters as well as cyclones and centrifuges. With the aid of baffle and screen systems, it has up to now been possible to separate oil drops down to a diameter of circa 10 $\mu$m, with metal wire filters and cyclones down to circa 1.5 $\mu$m and with multi-layer textile fibre filters, e.g. fleece filters, down to circa 0.4 $\mu$m. Baffle and screen systems have, in principle, an unlimited lifetime and do not produce any pressure losses, but do not provide sufficiently effective oil separation, since circa 80% of the oil mass in the oil mist in the blow-by gases consists of oil drops with a diameter which is less than 1.5 $\mu$m. Previously known metal wire filters and cyclones thus are not sufficient either for achieving effective oil separation despite the fact that they have acceptable lifetimes and provide limited pressure losses. Multi-layer fleece filters remain, but these have limited lifetimes and therefore must be replaced often, leading to high costs. They also produce significant pressure losses.

SUMMARY OF THE INVENTION

The purpose of the present invention is to achieve a device of the type described by way of introduction, i.e. a separator of centrifugal type, which is particularly, but not exclusively, intended for separation of oil mist drops from blow-by gases from internal combustion engines and which can separate liquid drops of less than 1 $\mu$m without having the disadvantage of a multi-layer fleece filter, for example.

This is achieved according to the invention by virtue of the fact that the inlet and the outlets communicate with each other via a plurality of layers of peripherally spaced, narrow channels extending in the direction of the rotational axis and being disposed at a radial distance from the rotational axis, said narrow channels having a radial dimension being adapted to their length, their radial distance to the rotational axis, the flow velocity of the gas and the rotational speed, so that at least the major portion of the liquid drops in the mist will have time to be deposited on the channel walls before they reach the outlet.

Tests performed have demonstrated that in a preferred embodiment particularly designed for separating oil mist from blow-by gases, with a suitable selection of the above-mentioned parameters, more than 90% of all the oil mist in the gases was separated out. The gas velocity, the distance which the oil drops must move radially outwards to strike the channel wall, and the radial acceleration determine in this case the required length of stay for the drops in the channels. This length of stay determines in turn the required channel length. It has been shown that the diameter (of circular channels) should not exceed, but should preferably be less than 1 mm for the separator to have reasonable dimensions and a reasonable rotational speed.

BRIEF DESCRIPTION OF THE DRAWINGS

The invention will be described in more detail below with reference to examples shown in the accompanying drawings, where.

Figure 1:
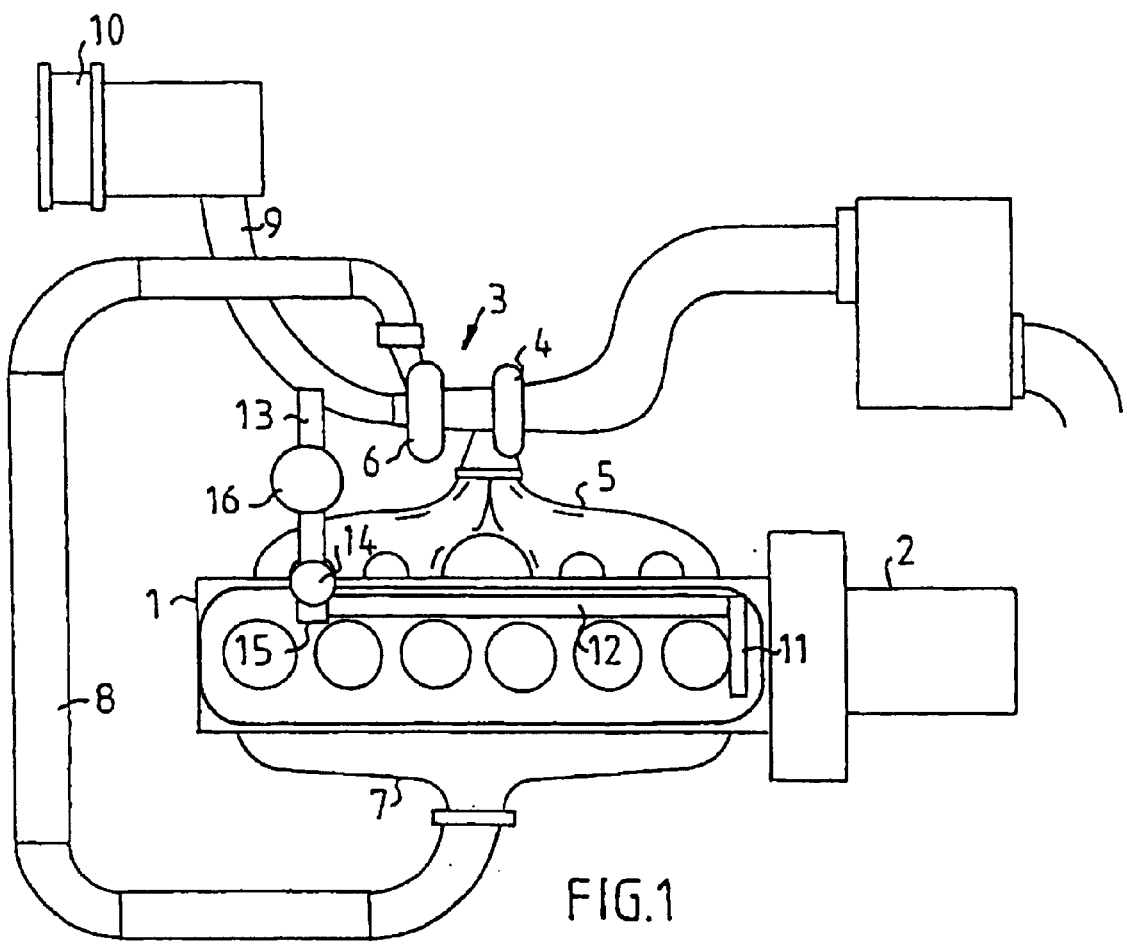
FIG. 1 shows a schematic representation of an engine installation with a device according to the invention, FIG. 2 schematic longitudinal section through one embodiment of a device according to the invention.

DESCRIPTION OF THE PREFERRED EMBODIMENTS 1 in FIG. 1 designates the engine block of a six-cylinder, four-stroke diesel engine, and 2 designates a gearbox with clutch, coupled to the engine crankshaft. The engine is supercharged by a turbo compressor 3, which has a turbine 4 coupled to the engine exhaust manifold 5, and a compressor 6 coupled to the inlet manifold 7 via a charge air cooler 8. The suction side of the compressor 6 is coupled via an inlet conduit 9 to an air filter 10.

Figure 2:
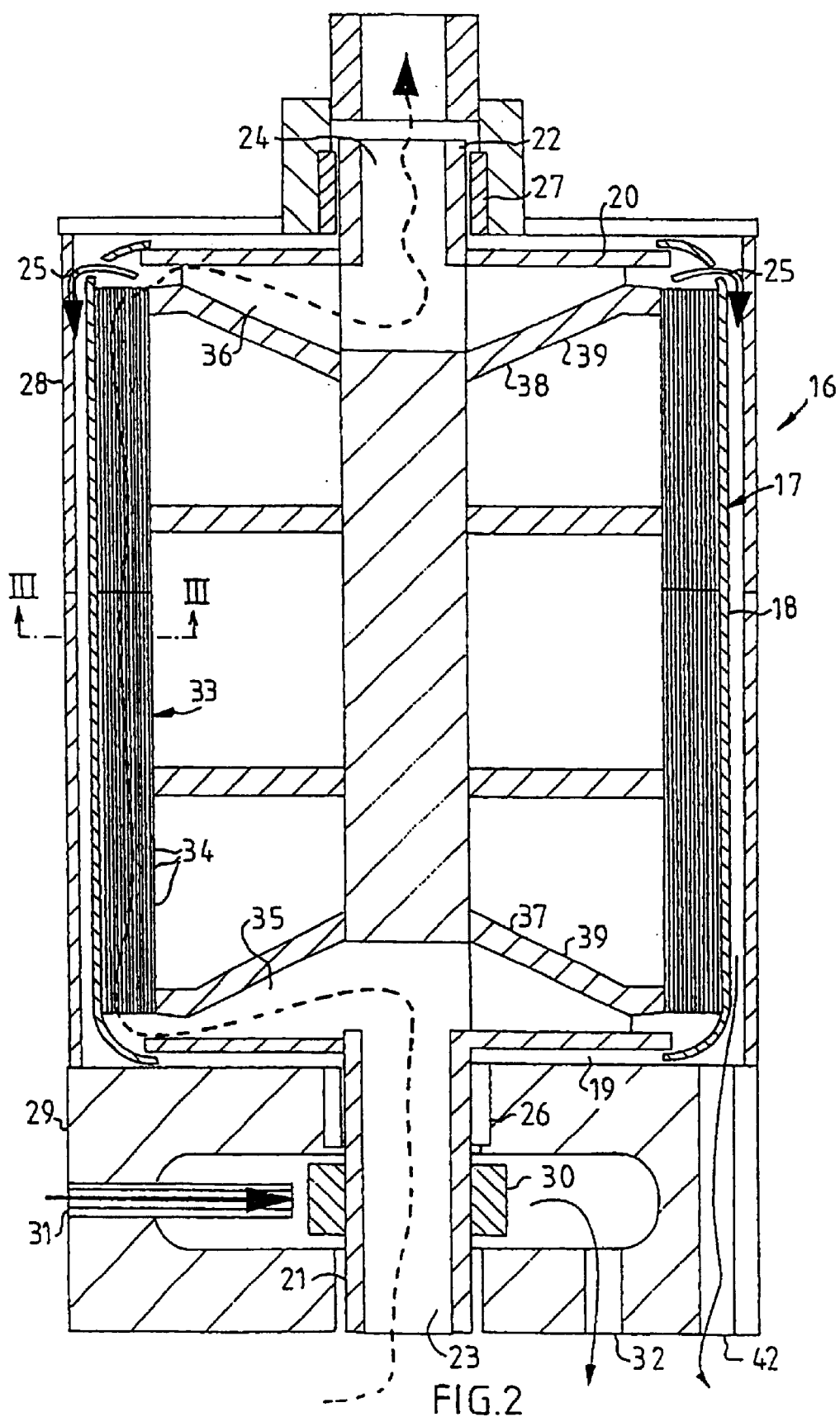

In the crankcase of the engine 1, a screen separator 11 and a baffle separator 12, known per se and only schematically indicated here, are arranged. A conduit 13 with a pressure regulator valve 14 and a pressure sensor 15 connect the engine crankcase with the inlet conduit 9 via an oil mist separator 16 according to the invention, which is shown in more detail in FIG. 2.

The separator 16 comprises an inner container 17, which is formed of a cylinder 18 and two end walls 19 and 20, each having a central opening in which a tubular shaft 21 and 22, respectively, is fixed. The interior channel 23 of the tubular shaft 21 forms an inlet for combustion gases and oil mist, while the channel 24 of the tubular shaft 22 forms an outlet for exhaust. Peripherally spaced openings 25 in the cylinder 18 form outlets for separated-out oil. The tubular shafts 21, 22 are mounted in bearings 26, 27 of a stationary outer container 28, which has a lower portion 29 forming a turbine housing. The lower tubular shaft 21 extends through the turbine housing 29 and carries a turbine rotor 30. The housing 29 has an inlet 31 and an outlet 32 for oil from the engine lubrication system. When the engine is in operation and lubricant is pumped through the housing 29, the turbine rotor 30 drives the shaft 21 so that the inner container 17 rotates in the outer container 28.

A cylindrical package 33 consisting of a plurality of layers of axial channels 34 is fixed to the lateral wall 18 of the inner container 17. It is also possible to integrate the cylindrical lateral wall 18 in the channel package 34. The channels 34 are open at their ends and communicate with radial passages 35, 36, which are defined between the respective end wall 19, 20, a pair of conical wall elements 37, 38 and intermediate, radially directed, peripherally evenly spaced intermediate walls 39. An enlarged portion of a channel package 33 with ten layers is shown in cross section in FIG. 3. The channels 34 are greatly enlarged. In realistic tests with an inner container with a channel length of circa 200 mm, an inner container radius of circa 100 mm and a rotational speed of circa 3 000 rpm, the radial dimension "r" of the channels should be slightly less than 1 mm, in order for there to be enough time for the smallest oil drops to strike the channel walls before the gases have flown out through the channels and out into the outlet passages 36.

Figure 3:
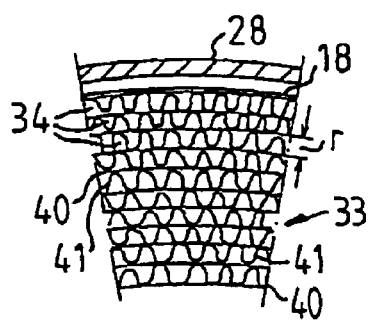
FIG. 3 is an enlarged cross-section along the line III—III in FIG. 2.

In the example shown in FIG. 3, the channels 34 in the channel package 33 are formed of alternating smooth and folded sheet metal cylinders 40 and 41, respectively, i.e. corresponding to the construction of corrugated cardboard. The channel package can also have a solid body, e.g. a ceramic body with drilled or cast cylindrical channels. The radial extent of the channel package amounts to approximately 20% of the radius of the first container. If the percentage is greater, there is a risk that the radially innermost channels will be so close to the rotational axis that the centrifugal force on the smallest drops will be too low to accelerate them out to the channel wall.

The oil, which is transported by the combustion gases through the channels 34 and under the influence of the centrifugal force as the inner container rotates, strikes the channel walls, is ejected through the openings 25, as indicated by the solid arrows, and runs down into the space between the containers to an outlet 42. From there the oil is led back to the engine crankcase. The combustion gases free of oil mist flow out through the upper tubular shaft 22, as indicated by the dashed arrow.

What is claimed is:

1. Device for separating small drops of liquid from a flowing gas, containing liquid mist, comprising:
    a first container (17), formed of a cylindrical lateral wall (18) and two opposite end walls (19, 20), said first container having an inlet (23) in one end wall for the gas/mist, a first outlet (24) in its other end wall for the gas and a second outlet (25) at or in the vicinity of the second end wall for liquid separated out of the gas,
    a second container (28) with means (26, 27) for rotatably mounting the first container in the second container rotationally symmetrically in relation to said inlet and said first outlet, and
    drive means (30) for rotation of the first container in the second container,
    wherein the inlet (23) and the outlets (24, 25) communicate with each other via a plurality of layers of peripherally spaced, narrow channels (34) extending in the direction of the rotational axis and being disposed at a radial distance from the rotational axis, said narrow channels having a radial dimension (r) being adapted to their length, their radial distance to the rotational axis, the flow velocity of the gas and the rotational speed, so that at least the major portion of the liquid drops in the mist will have time to be deposited on the channel walls before they reach the outlet, characterized in that
    the inlet (23) of the first container (17) is joined to a ventilation conduit from a crankcase of an internal combustion engine (1), and its outlet (24) is joined to an inlet air conduit to the engine, and
    the inlet (23) has an inlet opening placed concentrically with the rotational axis of the first container, said inlet opening leading to a plurality of radial inlet passages (35) leading out to inlets of the channels (34), and that the channels have outlets opening, firstly, into a plurality of radial outlet passages (36), through which the gas can flow into an outlet opening (24) placed concentrically with said rotational axis, and, secondly, into a plurality of outlet openings (25), through which liquid deposited under the effect of the centrifugal force on the walls of the channels, can flow radially outwards to a space between the first container and the second container.

2. Device according to claim 1, characterized in that the containers (17, 28) are oriented with the rotational axis vertical so that liquid separated out can flow, by the force of gravity, to the inlet end and out through a liquid outlet (42) from the second container (28).

3. Device according to claim 1, characterized in that the end walls have two axially spaced walls (19, 37 and 20, 38, respectively) which, together with intermediate radially directed wall portions (39), define said passages (35, 36).

4. Device according to claim 1, characterized in that the drive means are formed by a liquid turbine (30).

5. Device according to claim 4, characterized in that the end walls (19, 20) are joined to rotatably mounted hollow shafts (21, 22), the interiors of which forming inlet and outlet channels, respectively (23 and 24, respectively), and in that a turbine wheel (30) is fixed to one of said shafts.

6. Device according to claim 1, characterized in that the extent of the channel layers radially amounts to circa 20% of the radius of the first container (17).

7. Device according to claim 1, characterized in that the radius of the first container (17) is circa 100 mm and its length circa 200 mm, that the container is designed to be driven at a rotational speed of circa 3 000 rpm, that the radial dimension (r) of the channels (34) is less than 1 mm, and that the outermost channel layer is located at a maximum radial distance from the rotational axis.

8. Device for separating small drops of liquid from a flowing gas, containing liquid mist, comprising:
    a first container (17), formed of a cylindrical lateral wall (18) and two opposite end walls (19, 20), said first container having an inlet (23) in one end wall for the gas/mist, a first outlet (24) in its other end wall for the gas and a second outlet (25) at or in the vicinity of the second end wall for liquid separated out of the gas, a second container (28) with means (26, 27) for rotatably mounting the first container in the second container rotationally symmetrically in relation to said inlet and said first outlet, and drive means (30) for rotation of the first container in the second container, wherein the inlet (23) and the outlets (24, 25) communicate with each other via a plurality of layers of peripherally spaced, narrow channels (34) extending in the direction of the rotational axis and being disposed at a radial distance from the rotational axis, said narrow channels having a radial dimension (r) being adapted to their length, their radial distance to the rotational axis, the flow velocity of the gas and the rotational speed, so that at least the major portion of the liquid drops in the mist will have time to be deposited on the channel walls before they reach the outlet, characterized in that the inlet (23) of the first container (17) is joined to a ventilation conduit from a crankcase of an internal combustion engine (1), and its outlet (24) is joined to an inlet air conduit to the engine, and the containers (17, 28) are oriented with the rotational axis vertical so that liquid separated out can flow, by the force of gravity, to the inlet end and out through a liquid outlet (42) from the second container (28).

9. Device according to claim 8, characterized in that the end walls have two axially spaced walls (19, 37 and 20, 38, respectively) which, together with intermediate radially directed wall portions (39), define said passages (35, 36).

10. Device according to claim 9, characterized in that the inlet (23) has an inlet opening placed concentrically with the rotational axis of the first container, said inlet opening leading to a plurality of radial inlet passages (35) leading out to inlets of the channels (34), and that the channels have outlets opening, firstly, into a plurality of radial outlet passages (36), through which the gas can flow into an outlet opening (24) placed concentrically with said rotational axis, and, secondly, into a plurality of outlet openings (25), through which liquid deposited under the effect of the centrifugal force on the walls of the channels, can flow radially outwards to a space between the first container and the second container.

11. Device according to claim 8, characterized in that the drive means are formed by a liquid turbine (30).

12. Device according to claim 11, characterized in that the end walls (19, 20) are joined to rotatably mounted hollow shafts (21, 22), the interiors of which forming inlet and outlet channels, respectively (23 and 24, respectively), and in that a turbine wheel (30) is fixed to one of said shafts.

13. Device according to claim 8, characterized in that the extent of the channel layers radially amounts to circa 20% of the radius of the first container (17).

14. Device according to claim 8, characterized in that the radius of the first container (17) is circa 100 mm and its length circa 200 mm, that the container is designed to be driven at a rotational speed of circa 3 000 rpm, that the radial dimension (r) of the channels (34) is less than 1 mm, and that the outermost channel layer is located at a maximum radial distance from the rotational axis.

15. Device for separating small drops of liquid from a flowing gas, containing liquid mist, comprising:

a first container (17), formed of a cylindrical lateral wall (18) and two opposite end walls (19, 20), said first container having an inlet (23) in one end wall for the gas/mist, a first outlet (24) in its other end wall for the gas and a second outlet (25) at or in the vicinity of the second end wall for liquid separated out of the gas, a second container (28) with means (26, 27) for rotatably mounting the first container in the second container rotationally symmetrically in relation to said inlet and said first outlet, and drive means (30) for rotation of the first container in the second container, wherein the inlet (23) and the outlets (24, 25) communicate with each other via a plurality of layers of peripherally spaced, narrow channels (34) extending in the direction of the rotational axis and being disposed at a radial distance from the rotational axis, said narrow channels having a radial dimension (r) being adapted to their length, their radial distance to the rotational axis, the flow velocity of the gas and the rotational speed, so that at least the major portion of the liquid drops in the mist will have time to be deposited on the channel walls before they reach the outlet, characterized in that the inlet (23) of the first container (17) is joined to a ventilation conduit from a crankcase of an internal combustion engine (1), and its outlet (24) is joined to an inlet air conduit to the engine, and the inlet (23) has an inlet opening leading to a plurality of radial inlet passages (35) leading out to inlets of the channels (34), and that the channels have outlet openings, firstly, into a plurality of radial outlet passages (36), through which the gas can flow into an outlet opening (24) placed concentrically with said rotational axis.

16. Device according to claim 15, characterized in that the containers (17, 28) are oriented with the rotational axis vertical so that liquid separated out can flow, by the force of gravity, to the inlet end and out through a liquid outlet (42) from the second container (28).

17. Device according to claim 15, characterized in that the end walls have two axially spaced walls (19, 37 and 20, 38, respectively) which, together with intermediate radially directed wall portions (39), define said passages (35, 36).

18. Device according to claim 15, characterized in that the drive means are formed by a liquid turbine (30).

19. Device according to claim 18, characterized in that the end walls (19, 20) are joined to rotatably mounted hollow shafts (21, 22), the interiors of which forming inlet and outlet channels, respectively (23 and 24, respectively), and in that a turbine wheel (30) is fixed to one of said shafts.

20. Device according to claim 15, characterized in that the extent of the channel layers radially amounts to circa 20% of the radius of the first container (17).

* * * * *